United States Patent
Hartig et al.

(10) Patent No.: US 9,127,125 B2
(45) Date of Patent: Sep. 8, 2015

(54) PROCESS FOR PREPARING POLYURETHANE-POLYACRYLATE HYBRID DISPERSIONS

(75) Inventors: Jens Hartig, Ludwigshafen (DE); Manfred Dargatz, Worms (DE); Maria Teresa Hechavarria Fonseca, Mannheim (DE); Bas Lohmeijer, Mannheim (DE)

(73) Assignee: BASF SE, Ludwigshafen (DE)

( * ) Notice: Subject to any disclaimer, the term of this patent is extended or adjusted under 35 U.S.C. 154(b) by 8 days.

(21) Appl. No.: 13/995,648

(22) PCT Filed: Dec. 15, 2011

(86) PCT No.: PCT/EP2011/072848
§ 371 (c)(1),
(2), (4) Date: Jun. 19, 2013

(87) PCT Pub. No.: WO2012/084668
PCT Pub. Date: Jun. 28, 2012

(65) Prior Publication Data
US 2013/0281636 A1    Oct. 24, 2013

Related U.S. Application Data

(60) Provisional application No. 61/424,705, filed on Dec. 20, 2010.

(30) Foreign Application Priority Data

Dec. 20, 2010  (EP) ..................... 10195967

(51) Int. Cl.
| C08G 18/08  | (2006.01) |
| C08F 283/00 | (2006.01) |
| C08G 18/66  | (2006.01) |
| C09D 175/04 | (2006.01) |
| C08G 63/91  | (2006.01) |
| C08L 33/00  | (2006.01) |

(52) U.S. Cl.
CPC .......... *C08G 63/916* (2013.01); *C08F 283/006* (2013.01); *C08G 18/0823* (2013.01); *C08G 18/6659* (2013.01); *C09D 175/04* (2013.01); *C08L 33/00* (2013.01)

(58) Field of Classification Search
CPC ........... C08G 18/6659; C08G 18/0823; C08G 63/916; C08F 283/006; C09D 175/04; C08L 33/00
USPC ............................. 525/440, 440.08
See application file for complete search history.

(56) References Cited

U.S. PATENT DOCUMENTS

| 3,412,054 | A |   | 11/1968 | Milligan et al. |
| 3,705,164 | A |   | 12/1972 | Honig et al. |
| 3,905,929 | A |   | 9/1975  | Noll |
| 3,920,598 | A |   | 11/1975 | Reiff et al. |
| 4,192,937 | A |   | 3/1980  | Noll et al. |
| 4,269,748 | A |   | 5/1981  | Nachtkamp et al. |
| 4,292,226 | A |   | 9/1981  | Wenzel et al. |
| 5,137,961 | A | * | 8/1992  | Goos et al. ............ 524/457 |
| 5,945,473 | A |   | 8/1999  | Kielbania et al. |
| 6,362,273 | B1| * | 3/2002  | Martin et al. .......... 524/591 |
| 2004/0014880 | A1 | * | 1/2004 | Kuba et al. ............ 524/589 |
| 2004/0034146 | A1 |   | 2/2004 | Gertzmann et al. |
| 2008/0166485 | A1 |   | 7/2008 | Steenwinkel et al. |

FOREIGN PATENT DOCUMENTS

| CA | 1 129 128      | 8/1982  |
| DE | 1 248 943      | 8/1967  |
| DE | 1 495 745      | 6/1969  |
| DE | 2 034 479      | 1/1972  |
| DE | 41 40 486      | 6/1993  |
| DE | 196 21 027     | 11/1997 |
| DE | 10 2007 028 890| 5/2008  |
| EP | 1 185 568      | 12/2002 |
| EP | 1 173 491      | 12/2003 |
| EP | 1 391 471      | 2/2004  |
| EP | 1 228 113      | 4/2008  |
| WO | 99 16805       | 4/1999  |
| WO | 02 098939      | 12/2002 |
| WO | 2005 090430    | 9/2005  |
| WO | 2006 097318    | 9/2006  |
| WO | 2010 142617    | 12/2010 |

OTHER PUBLICATIONS

BASF Monomers Brochure, Feb. 3, 2012.*
Thermal Transitions of Homopolymers, Feb. 1, 2002.*
International Search Report Issued Feb. 27, 2012 in PCT/EP11/72848 Filed Dec. 15, 2011.

* cited by examiner

Primary Examiner — Randy Gulakowski
Assistant Examiner — Christopher M Rodd
(74) Attorney, Agent, or Firm — Oblon, McClelland, Maier & Neustadt, L.L.P.

(57) ABSTRACT

The present invention relates to a new process for preparing polyurethane-polyacrylate hybrid dispersions, and to the resulting dispersions and their use.

20 Claims, No Drawings

PROCESS FOR PREPARING POLYURETHANE-POLYACRYLATE HYBRID DISPERSIONS

CROSS-REFERENCE TO RELATED APPLICATIONS

This application is a National Stage of PCT/EP2011/072848 filed on Dec. 15, 2011, which claims the benefit of priority to U.S. Provisional Application No. 61/424,705 filed on Dec. 20, 2010. This application is based upon and claims the benefit of priority to European Application No. 10 195 967.4 filed on Dec. 20, 2010.

The present invention relates to a new process for preparing polyurethane-polyacrylate hybrid dispersions, and to the resulting dispersions and their use.

U.S. Pat. No. 3,705,164 discloses the preparation of polyurethane-polyacrylate hybrid dispersions in general form. To this end, free-radically polymerizable, olefinically unsaturated monomers are subjected to free-radical polymerization in the presence of a polyurethane dispersion with the aid of polymerization catalysts, such as peroxides or azo compounds, for example. The polymerization catalysts are used preferably in the presence of compounds having a reducing action. In the description and in the examples which are carried out explicitly, the reactions are started with the aid of a mixture of the polymerization catalyst and the reducing compound at the particular reaction temperature.

EP 1228113 B2 discloses the preparation of polyurethane-polymer hybrid dispersions, where, first of all, polyurethane dispersion, monomers, and initiator component are mixed at a temperature of 15 to 35° C. and this mixture is reacted in a subsequent reaction step at a temperature of 80+/−10° C.

An advantage is said to be that the polyurethane dispersion already has stabilizing effect and, furthermore, that there is no need to add further emulsifier.

Initiator components disclosed are various peroxides and azo compounds. The presence of compounds having a reducing action is not disclosed.

A disadvantage associated with the polymerization of olefinically unsaturated monomers in the presence or absence of polyurethanes is the formation of coagulum during the reaction. This is evident in the case of the process of EP 1228113 B2, for example, from the need for filtration through a 100 μm sieve after the end of the reaction; see paragraph [0073] therein.

EP 1173491 B1 describes the polymerization of a mixture of monofunctional and difunctional ethylenically saturated compounds in the presence of a polyester polyol, polyurethane or polyacrylate, with a redox initiator system, and the use thereof as coating materials.

EP 1185568 B1 describes the same reaction principle, where the polymerization can be performed in two stages.

A disadvantage of the two last-mentioned documents is that, for the coating systems described therein, it is in each case necessary to have a high molecular mass crosslinker, a melamine-formaldehyde resin, for example, in order to form a coating, and that this crosslinker must be metered in by the formulator, entailing the risk of incorrect metering and hence of failure to comply with reactive proportions.

It was an object of the present invention to develop new polyurethane-polyacrylate hybrid dispersions which, without the need for metered addition of a crosslinker at the premises of the formulator, produce coatings having good properties, more particularly high elasticities, blocking resistance, and water resistance, with a tensile strength which is comparable with that of conventional polyacrylate dispersions. The dispersions, furthermore, are to exhibit low yellowing and therefore are to be useful for exterior applications.

This object has been achieved by means of polyurethane-polyacrylate hybrid dispersions obtainable by two-stage free-radical polymerization of ethylenically unsaturated compounds in the presence of at least one polyurethane (P1), where in a first stage at least one ethylenically unsaturated compound (e) is subjected to at least partial free-radical polymerization in the presence of the at least one polyurethane (P1), at least one redox initiator system (I), and at least one iron compound (F)

and subsequently in a second stage at least one ethylenically unsaturated compound (f)

is subjected to free-radical polymerization, where the at least one polyurethane (P1) is composed exclusively of aliphatic and/or cycloaliphatic isocyanates as isocyanate-group-containing synthesis components and has an at least partially neutralized acid group content of less than 500 mmol per kg of polyurethane, the at least one ethylenically unsaturated compound (e) of the first stage has a glass transition temperature of at least 50° C., the at least one ethylenically unsaturated compound (f) of the second stage has a glass transition temperature of up to 20° C., the weight ratio of polyurethane (P1) to the sum of the ethylenically unsaturated compounds (e) and (f) of the first and second stages is from 50:50 to 10:90, and the temperature during the free-radical polymerization is not more than 85° C.

The dispersions of the invention do not require any additional high molecular mass crosslinker for use in coatings, and are equally suitable both for interior and for exterior applications. They display high suitability, in particular, as coatings for wood and woodbase materials, in terms, for example, of filming, blocking resistance, and water whitening, and also, in one preferred embodiment, in dry transparency. When the monomer diacetoneacrylamide (DAAM) is used as component (e2) or (f2) (see below), in one preferred embodiment of the present invention adipic dihydrazide (ADDH) is added as a low molecular mass crosslinker to the dispersion. Since ADDH resides predominantly in the water phase of the dispersion, crosslinking takes place only on drying, through removal of the water phase. Consequently, ADDH can be added after the dispersion has been prepared, so that for the user there is no need to add an additional crosslinker.

It is an advantage, moreover, that in the process for preparing the dispersions of the invention there is no need to use additional emulsifiers, dispersing assistants and/or protective colloids.

The polyurethane (P1) may be any desired polyurethane synthesized exclusively from aliphatic and/or cycloaliphatic isocyanates, referred to collectively in this specification as (cyclo)aliphatic isocyanates, as synthesis components containing isocyanate groups, and having an at least partially neutralized acid group content of less than 500 mmol per kg of polyurethane (P1), preferably below 400, more preferably below 350, and very preferably below 300 mmol per kg of polyurethane (P1).

Acid groups in this context are carboxyl groups, sulfur-containing or phosphorus-containing acids, preferably carboxyl groups or sulfonate groups, and very preferably carboxyl groups.

These acid groups may be wholly or partly neutralized, in other words may be present in their anionic form. Counterions to these anionic groups that are preferred are ammonium, sodium and/or potassium.

The use of (cyclo)aliphatic isocyanates as synthesis components for the polyurethane reduces yellowing of the polyurethane in the resultant coating, as would occur if aromatic isocyanates were used. Where yellowing of the coating is not an issue, the use of aromatic isocyanates would be conceivable.

As a result of the indicated presence of acid groups, the polyurethane (P1) is dispersible in water, and so the polyurethane (P1) is used in the form of an aqueous polyurethane dispersion, and the ethylenically unsaturated compounds (e) and (f) are reacted in an emulsion polymerization.

A higher level of acid groups in the polyurethanes generally has the effect of increased susceptibility to water, which is manifested in increased water absorption and/or greater water whitening.

One feature of the invention is that the weight ratio of polyurethane (P1) to the sum of the ethylenically unsaturated compounds (e) and (f) of the first and second stages is from 50:50 to 10:90, preferably up to 20:80, and more preferably up to 30:70.

In accordance with the invention it makes no difference whether the polyurethane dispersion is prepared in situ before the free-radical polymerization or separately therefrom; preferably, it is prepared separately.

Polyurethane dispersions are industrially prepared frequently via what is called the "prepolymer mixing process". In that process, polyurethanes are first prepared in an organic solvent, frequently N-methylpyrrolidone (NMP), and the resulting polyurethane solution is then dispersed in water. During and/or after its dispersion in water, the polyurethane may have its molar mass increased further by means of chain extension.

Depending on the boiling point of the solvent used, the solvent, even in the case of distillative removal, remains present in the dispersion to a greater or lesser extent, where it then influences the properties of the polyurethane dispersion.

Since not all solvents are toxicologically unobjectionable, the solvent used ought as far as possible to be nontoxic. In place of NMP, other solvents are now known, and are used with preference in accordance with the invention. Such solvents are N-(cyclo)alkylpyrrolidones, preferably N-ethylpyrrolidone, as known from WO 2005/090430, mixtures of N-(cyclo)alkylpyrrolidone/dialkylene glycol dialkyl ethers, preferably N-ethylpyrrolidone/dipropylene glycol dimethyl ether, or N-alkylcaprolactams, as known from DE 102007028890, and ring-substituted N-alkylpyrrolidines, as are known, for example, from the international application with the file reference PCT/EP2010/057868 and the filing date of Jun. 7, 2010 and are used preferably in accordance with the invention as a substitute for the toxic NMP.

Preferred aqueous polyurethane dispersions are obtainable by

I) preparing a polyurethane by reacting
a) at least one polyfunctional isocyanate having 4 to 30 C atoms,
b) diols of which
b1) 10 to 100 mol %, based on the total amount of the diols (b), have a molecular weight of 500 to 5000 and
b2) 0 to 90 mol %, based on the total amount of the diols (b), have a molecular weight of 60 to 500 g/mol,
c) optionally further polyfunctional compounds, different from the diols (b), having reactive groups which are alcoholic hydroxyl groups or primary or secondary amino groups and
d) monomers different from the monomers (a), (b), and (c), having at least one isocyanate group or at least one group which is reactive toward isocyanate groups, additionally carrying at least one hydrophilic group or one potentially hydrophilic group which makes the polyurethanes dispersible in water, to give a polyurethane in the presence of a solvent, and II) subsequently dispersing the polyurethane in water, III) with the possible addition before, during and/or after step II, optionally of polyamines.

Suitable monomers in (a) include the polyisocyanates customarily employed in polyurethane chemistry, examples being aliphatic and cycloaliphatic diisocyanates and polyisocyanates, the aliphatic hydrocarbon radicals containing for example 4 to 12 carbon atoms and the cycloaliphatic hydrocarbon radicals containing for example 6 to 15 carbon atoms, having an NCO functionality of at least 1.8, preferably 1.8 to 5 and more preferably 2 to 4, and also their isocyanurates, biurets, allophanates and uretdiones.

The diisocyanates are preferably isocyanates having 4 to 20 C atoms. Examples of customary diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, esters of lysine diisocyanate, tetramethylxylylene diisocyanate, trimethylhexane diisocyanate or tetramethylhexane diisocyanate, cycloaliphatic diisocyanates such as 1,4-, 1,3- or 1,2-diisocyanatocyclohexane, trans/trans, the cis/cis and the cis/trans isomer of 4,4'- or 2,4'-di(isocyanatocyclohexyl)-methane, 1-isocyanato-3,3,5-trimethyl-5-(isocyanatomethyl)cyclohexane (isophorone diisocyanate), 2,2-bis(4-isocyanatocyclohexyl)propane, 1,3- or 1,4-bis(isocyanato-methyl)cyclohexane or 2,4- or 2,6-diisocyanato-1-methylcyclohexane.

Mixtures of said diisocyanates may also be present.

Preference is given to aliphatic and cycloaliphatic diisocyanates, and particular preference to isophorone diisocyanate, hexamethylene diisocyanate and 4,4'-di(isocyanatocyclohexyl)methane ($H_{12}$MDI), very preferably isophorone diisocyanate and/or hexamethylene diisocyanate.

Suitable polyisocyanates include polyisocyanates containing isocyanurate groups, uretdione diisocyanates, polyisocyanates containing biuret groups, polyisocyanates containing urethane groups or allophanate groups, polyisocyanates comprising oxadiazinetrione groups, uretonimine-modified polyisocyanates of linear or branched $C_4$-$C_{20}$ alkylene diisocyanates, or cycloaliphatic diisocyanates having 6 to 20 C atoms, in all, or mixtures thereof.

The diisocyanates and polyisocyanates which can be used preferably have an isocyanate group (calculated as NCO, molecular weight=42) content of 10% to 60% by weight based on the diisocyanate and polyisocyanate (mixture), preferably 15% to 60% by weight and very preferably 20% to 55% by weight.

Preference is given to aliphatic and/or cycloaliphatic diisocyanates and polyisocyanates, examples being the abovementioned aliphatic and cycloaliphatic diisocyanates, respectively, or mixtures thereof.

Preference extends to
1) Polyisocyanates containing isocyanurate groups and formed from aliphatic and/or cycloaliphatic diisocyanates. Particular preference is given here to the corresponding aliphatic and/or cycloaliphatic isocyanato-isocyanurates and, in particular, to those based on hexamethylene diisocyanate and isophorone diisocyanate. The isocyanurates present are, in particular, trisisocyanatoalkyl or trisisocyanatocycloalkyl isocyanurates, which represent cyclic trimers of the diisocyanates, or are mixtures with their higher homologs containing more than one isocyanurate ring. The isocyanato-isocyanurates generally have an NCO content of 10% to 30% by weight, in particular 15% to 25% by weight, and an average NCO functionality of 3 to 4.5.
2) Uretdione diisocyanates having aliphatically and/or cycloaliphatically attached isocyanate groups, preferably aliphatically and/or cycloaliphatically attached isocyanate groups, and especially those derived from hexamethylene diisocyanate or isophorone diisocyanate. Uretdione diisocyanates are cyclic dimerization products of diisocyanates. In the formulations the uretdione diisocyanates can be used as sole component or in a mixture with other polyisocyanates, especially those specified under 1).
3) Polyisocyanates containing biuret groups and having cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18% to 22% by weight and an average NCO functionality of 3 to 4.5.
4) Polyisocyanates containing urethane and/or allophanate groups and having aliphatically or cycloaliphatically attached, preferably aliphatically or cycloaliphatically attached, isocyanate groups, as obtainable for example by reacting excess amounts of hexamethylene diisocyanate or of isophorone diisocyanate with polyhydric alcohols such as trimethylolpropane, neopentyl glycol, pentaerythritol, 1,4-butanediol, 1,6-hexanediol, 1,3-propanediol, ethylene glycol, diethylene glycol, glycerol, 1,2-dihydroxypropane or mixtures thereof. These polyisocyanates containing urethane and/or allophanate groups generally have an NCO content of 12% to 20% by weight and an average NCO functionality of 2.5 to 3.
5) Polyisocyanates comprising oxadiazinetrione groups, preferably derived from hexamethylene diisocyanate or isophorone diisocyanate. Polyisocyanates of this kind comprising oxadiazinetrione groups can be prepared from diisocyanate and carbon dioxide.
6) Uretonimine-modified polyisocyanates.

The polyisocyanates 1) to 6) can be used in a mixture, optionally also in a mixture with diisocyanates.

As compounds (a) it is also possible to employ isocyanates which in addition to the free isocyanate groups carry further, blocked isocyanate groups, e.g., uretdione or urethane groups.

Optionally, it is also possible to use those isocyanates which carry only one isocyanate group. In general their fraction is not more than 10 mol %, based on the overall molar amount of the monomers. The monoisocyanates normally carry other functional groups such as olefinic groups or carbonyl groups and serve for introducing, into the polyurethane, functional groups which allow it to be dispersed and/or crosslinked or to undergo further polymer-analogous reaction. Monomers suitable for this purpose include those such as isopropenyl-α,α-dimethylbenzyl isocyanate (TMI).

Diols (b) which are ideally suitable are those diols (b1) which have a relatively high molecular weight of about 500 to 5000, preferably of about 1000 to 4000 g/mol.

The diols (b1) are, in particular, polyester polyols, which are known, for example, from Ullmanns Encyklopädie der technischen Chemie, 4th Edition, Vol. 19, pp. 62 to 65. It is preferred to employ polyester polyols that are obtained by reacting dihydric alcohols with dibasic carboxylic acids. Instead of the free polycarboxylic acids it is also possible to use the corresponding polycarboxylic anhydrides or corresponding polycarboxylic esters of lower alcohols, or mixtures thereof, to prepare the polyester polyols. The polycarboxylic acids can be aliphatic, cycloaliphatic, araliphatic, aromatic or heterocyclic and can be optionally substituted, by halogen atoms, for example, and/or unsaturated. Examples are suberic, azelaic, phthalic, and isophthalic acid, phthalic, tetrahydrophthalic, hexahydrophthalic, tetrachlorophthalic, endomethylenetetrahydrophthalic, glutaric and maleic anhydride, maleic acid, fumaric acid and dimeric fatty acids. Preference is given to dicarboxylic acids of the general formula HOOC—$(CH_2)_y$—COOH, where y is a number from 1 to 20, preferably an even number from 2 to 20, examples being succinic, adipic, sebacic and dodecane-dicarboxylic acids.

Examples of suitable polyhydric alcohols are ethylene glycol, 1,2-propanediol, 1,3-propanediol, 1,3-butanediol, 1,4-butenediol, 1,4-butynediol, 1,5-pentanediol, neopentyl glycol, bis(hydroxymethyl)cyclohexanes such as 1,4-bis(hydroxymethyl)cyclohexane, 2-methyl-1,3-propanediol and also diethylene glycol, triethylene glycol, tetraethylene glycol, polyethylene glycol, dipropylene glycol, polypropylene glycol, dibutylene glycol and polybutylene glycols. Preference is given to neopentyl glycol and alcohols of the general formula HO—$(CH_2)_x$—OH, where x is a number from 1 to 20, preferably an even number from 2 to 20. Examples of such alcohols are ethylene glycol, 1,4-butanediol, 1,6-hexanediol, 1,8-octanediol and 1,12-dodecanediol.

Also suitable are polycarbonate diols, as can be obtained, for example, by reaction of phosgene with an excess of the low molecular mass alcohols cited as synthesis components for the polyester polyols.

Lactone-based polyester diols are also suitable, these being homopolymers or copolymers of lactones, preferably hydroxy-terminal adducts of lactones with suitable difunctional starter molecules. Suitable lactones are preferably those derived from hydroxycarboxylic acids of the general formula HO—$(CH_2)_z$—COOH, where z is from 1 to 20, preferably an odd number from 3 to 19. Examples are ε-caprolactone, β-propiolactone, γ-butyrolactone and/or methyl-ε-caprolactone, and mixtures thereof. Examples of suitable starter components are the low molecular mass dihydric alcohols cited above as synthesis components for the polyester polyols. The corresponding polymers of ε-caprolactone are particularly preferred. Lower polyesterdiols or polyetherdiols can also be employed as starters for preparing the lactone polymers. Instead of the polymers of lactones it is also possible to employ the corresponding, chemically equivalent polycondensates of the hydroxycarboxylic acids which correspond to the lactones.

Further suitable monomers (b1) are polyether diols. They are obtainable in particular by addition polymerization of ethylene oxide, propylene oxide, butylene oxide, tetrahydrofuran, styrene oxide or epichlorohydrin with itself, in the presence, for example, of $BF_3$, or by addition reaction of these compounds, alone or in a mixture or in succession, onto starter components containing reactive hydrogens, such as alcohols or amines, examples being water, ethylene glycol, 1,2-propanediol, 1,3-propanediol, 2,2-bis(4-hydroxydiphenyl)propane or aniline. Particular preference is given to polyethylene glycol, polypropylene glycol or polytetrahydrofuran having a molecular weight of 500 to 5000 g/mol and, in particular, 1000 to 4500 g/mol; very particular preference is given to polyethylene glycol or polypropylene glycol.

The polyester diols and polyether diols can also be employed as mixtures in proportions of 0.1:1 to 1:9.

One preferred embodiment of the present invention is to use a polyurethane (P1) in which the diol b1) is at least in part a polyester which comprises in incorporated form, as synthesis component, at least in part, a 1,2- or 1,3-disubstituted cyclic dicarboxylic acid, preferably a 1,3-disubstituted cyclic dicarboxylic acid, more preferably a 1,3-disubstituted aromatic dicarboxylic acid.

The preparation of polyesters is known in principle from Ullmanns Encyklopädie der technischen Chemie, 4th edition, volume 19, pp. 62 to 65. The preferred embodiment uses polyester polyols which are obtained by reacting dihydric alcohols b1a) with dibasic carboxylic acids b1b). In place of the free polycarboxylic acids it is also possible to use the corresponding polycarboxylic anhydrides or corresponding polycarboxylic esters of lower alcohols, or mixtures thereof, for preparing the polyester polyols.

The polyesters used at least in part in accordance with the invention comprise at least in part, as divalent carboxylic acids or derivatives thereof that are used, a 1,2- or 1,3-disubstituted cyclic dicarboxylic acid b1b1), preferably a 1,3-disubstituted dicarboxylic acid, in incorporated form. As well as the two carboxyl groups in positions 1,2- or 1,3-on the ring to one another, the dicarboxylic acids may optionally carry further substituents; preferably they do not carry any further substituents.

The ring may be cycloaliphatic or, preferably, aromatic.

Preferred 1,2- or 1,3-disubstituted cyclic dicarboxylic acids b1b1) are phthalic acid, isophthalic acid, phthalic anhydride, tetrahydrophthalic anhydride, hexahydrophthalic anhydride, tetrachlorophthalic anhydride, and endomethylenetetrahydrophthalic anhydride; isophthalic acid is particularly preferred.

The polyesters, furthermore, may comprise other dicarboxylic acids b1b2), which are different from the stated dicarboxylic acids b1b1).

These polycarboxylic acids b1b2) may be aliphatic, cycloaliphatic, araliphatic, aromatic or heterocyclic and may optionally be substituted, by halogen atoms, for example, and/or unsaturated. Examples of such include the following: suberic acid, azelaic acid, glutaric anhydride, maleic acid, maleic anhydride, fumaric acid, dimeric fatty acids.

Preference is given to dicarboxylic acids of the general formula HOOC—$(CH_2)_y$—COOH, where y is a number from 1 to 20, preferably an even number from 2 to 20, examples being succinic acid, adipic acid, dodecanedicarboxylic acid, and sebacic acid.

The ratio of 1,2- or 1,3-disubstituted cyclic dicarboxylic acids b1b1) to other dicarboxylic acids b1b2) may be 10-100 mol %:90-0 mol %, based on the total amount of dicarboxylic and polycarboxylic acids in the polyester b1), preferably 20-90 mol %:80-10 mol %, more preferably 30-70 mol %:70-30 mol %, and very preferably 30-50 mol %:70-50 mol %.

Examples of suitable polyhydric alcohols b1a) are ethylene glycol, 1,2-propanediol, 1,3-propanediol, 1,3-butanediol, 1,4-butenediol, 1,4-butynediol, 1,5-pentanediol, neopentyl glycol, bis(hydroxymethyl)cyclohexanes such as 1,1-, 1,2-, 1,3- or 1,4-bis(hydroxymethyl)cyclohexane, 2-methyl-1,3-propanediol and also diethylene glycol, triethylene glycol, tetraethylene glycol, polyethylene glycol, dipropylene glycol, polypropylene glycol, dibutylene glycol and polybutylene glycols. Preference is given to neopentyl glycol and alcohols of the general formula HO—$(CH_2)_x$—OH, where x is a number from 1 to 20, preferably an even number from 2 to 20. Examples of such alcohols are ethylene glycol, 1,4-butanediol, 1,6-hexanediol, 1,8-octanediol and 1,12-dodecanediol.

It is possible to employ as diols (b) not only the diols (b1) but also low molecular mass diols (b2) having a molecular weight of from about 50 to 500, preferably from 60 to 200 g/mol.

Compounds employed as monomers (b2) are in particular the synthesis components of the short-chain alkanediols mentioned for the preparation of polyester polyols, examples being ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, neopentyl glycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, hydroquinone, bisphenol A, bisphenol F, bisphenol B, bisphenol S, 2,2-bis (4-hydroxycyclohexyl)propane, 1,1-, 1,2-, 1,3- and 1,4-cyclohexanedimethanol, 1,2-, 1,3- or 1,4-cyclohexanediol, preference being given to the unbranched diols having 2 to 12 C atoms and an even number of C atoms, and to 1,5-pentanediol and neopentyl glycol.

The proportion of the diols (b1), based on the total amount of the diols (b), is preferably 10 to 100 mol %, and the proportion of the diols (b2), based on the total amount of the diols (b), is preferably 0 to 90 mol %. With particular preference the ratio of the diols (b1) to the diols (b2) is 0.2:1 to 5:1, especially 0.5:1 to 2:1.

The monomers (c), which are different from the diols (b), serve generally for crosslinking or chain extension. They are generally nonaromatic alcohols with a functionality of more than two, amines having 2 or more primary and/or secondary amino groups, and compounds which as well as one or more alcoholic hydroxyl groups carry one or more primary and/or secondary amino groups.

Alcohols having a functionality greater than 2, which may serve to bring about a certain degree of crosslinking or branching, are for example trimethylolbutane, trimethylolpropane, trimethylolethane, pentaerythritol, glycerol, sugar alcohols, such as sorbitol, mannitol, diglycerol, threitol, erythritol, adonitol (ribitol), arabitol (lyxitol), xylitol, dulcitol (galactitol), maltitol or isomalt, or sugars.

Also suitable are monoalcohols which in addition to the hydroxyl group carry a further isocyanate-reactive group, such as monoalcohols having one or more primary and/or secondary amino groups, monoethanolamine being one example.

Polyamines having 2 or more primary and/or secondary amino groups can be used in the prepolymer mixing technique particularly when the chain extension and/or crosslinking is to take place in the presence of water (step III), since amines generally react more quickly with isocyanates than do alcohols or water. This is frequently necessary when aqueous dispersions of crosslinked polyurethanes or polyurethanes of high molar weight are required. In such cases the approach taken is to prepare prepolymers containing isocyanate groups, to disperse them rapidly in water and then to subject them to chain extension or crosslinking by adding compounds having two or more isocyanate-reactive amino groups.

It is also possible to carry out the chain extension with polyamines having 2 primary and/or secondary amino groups prior to the operation of dispersing in water, as is taught, for example, in WO 02/98939.

Amines suitable for this purpose are generally polyfunctional amines of the molar weight range from 32 to 500 g/mol, preferably from 60 to 300 g/mol, which comprise at least two primary, two secondary or one primary and one secondary amino group(s). Examples of such are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexyl-methane, 1,4-diaminocyclohexane, aminoethylethanolamine, hydrazine, hydrazine hydrate or triamines such as diethylenetriamine or 1,8-diamino-4-aminomethyloctane or higher amines such as triethylenetetramine, tetraethylenepentamine or polymeric amines such as polyethylenamines, hydrogenated polyacrylonitriles or at least partly hydrolyzed poly-N-vinylformamides, in each case having a molar weight of up to 2000, preferably up to 1000 g/mol.

The amines can also be used in blocked form, such as in the form of the corresponding ketimines (see, e.g., CA-1 129 128), ketazines (cf., e.g., U.S. Pat. No. 4,269,748) or amine salts (see U.S. Pat. No. 4,292,226). Oxazolidines as well, as used for example in U.S. Pat. No. 4,192,937, are blocked polyamines which can be used for preparing the polyurethanes for chain extending the prepolymers. When blocked polyamines of this kind are used they are generally mixed with the prepolymers in the absence of water and this mixture is subsequently mixed with the dispersion water or a portion thereof, and so the corresponding polyamines are liberated by hydrolysis.

Preference is given to using mixtures of diamines and triamines, and particular preference to mixtures of isophoronediamine and diethylenetriamine.

The fraction of polyamines can be up to 10, preferably up to 8 mol % and more preferably up to 5 mol %, based on the total amount of components (b) and (c).

The polyurethane prepared in step I may contain in general up to 10%, preferably up to 5%, by weight of unreacted NCO groups.

The molar ratio of NCO groups in the polyurethane prepared in step I to the sum of primary and secondary amino groups in the polyamine is generally chosen in step III so as to be between 3:1 and 1:3, preferably 2:1 and 1:2, more preferably 1.5:1 and 1:1.5, and very preferably 1:1.

A further possibility, for chain termination, is to use minor amounts—that is, preferably, amounts of less than 10 mol %, based on components (b) and (c)—of monoalcohols. They serve primarily to limit the molar weight of the polyurethane. Examples are methanol, ethanol, isopropanol, n-propanol, n-butanol, isobutanol, sec-butanol, tert-butanol, ethylene glycol monomethyl ether, ethylene glycol monoethyl ether, 1,3-propanediol monomethyl ether, n-hexanol, n-heptanol, n-octanol, n-decanol, n-dodecanol (lauryl alcohol) and 2-ethylhexanol.

In order to render the polyurethanes dispersible in water they are synthesized not only from components (a), (b) and (c) but also from monomers (d), which are different from components (a), (b) and (c) and carry at least one isocyanate group or at least one group that is reactive toward isocyanate groups, and, in addition, at least one hydrophilic group or a group which can be converted into hydrophilic groups. In the text below, the term "hydrophilic groups or potentially hydrophilic groups" is abbreviated to "(potentially) hydrophilic groups". The (potentially) hydrophilic groups react with isocyanates much more slowly than do the functional groups of the monomers that are used to build up the polymer main chain. The (potentially) hydrophilic groups can be nonionic or, preferably, ionic, i.e., cationic or anionic, hydrophilic groups or can be potentially ionic hydrophilic groups, and with particular preference can be anionic hydrophilic groups or potentially anionic hydrophilic groups.

The proportion of the components having (potentially) hydrophilic groups as a fraction of the total amount of components (a), (b), (c) and (d) is generally made such that the polyurethane (P1) is the above-described acid group content.

Examples of suitable nonionic hydrophilic groups include mixed or pure polyethylene glycol ethers made up of preferably 5 to 100, more preferably 10 to 80, repeating ethylene oxide units. The polyethylene glycol ethers may also comprise propylene oxide units. Where such is the case the amount of propylene oxide units ought not to exceed 50%, preferably 30%, by weight based on the mixed polyethylene glycol ether.

The amount of polyethylene oxide units is generally 0% to 10%, preferably 0% to 6%, by weight based on the amount by weight of all monomers (a) to (d).

Preferred monomers containing nonionic hydrophilic groups are the polyethylene glycol and diisocyanates which carry a terminally etherified polyethylene glycol radical. Diisocyanates of this kind and also processes for their preparation are specified in U.S. Pat. Nos. 3,905,929 and 3,920,598.

Ionic hydrophilic groups are, in particular, anionic groups such as the sulfonate, the carboxylate and the phosphate group in the form of their alkali metal or ammonium salts and also cationic groups such as ammonium groups, especially protonated tertiary amino groups or quaternary ammonium groups.

Suitable monomers containing potentially anionic groups are usually aliphatic, cycloaliphatic, araliphatic or aromatic monohydroxycarboxylic and dihydroxycarboxylic acids which carry at least one alcoholic hydroxyl group or one primary or secondary amino group.

Such compounds are represented for example by the general formula

in which
RG is at least one isocyanate-reactive group,
DG is at least one actively dispersing group and
$R^4$ is an aliphatic, cycloaliphatic or aromatic radical comprising 1 to 20 carbon atoms.

Examples of RG are —OH, —SH, —NH$_2$ or —NHR$^5$, where R$^5$ can be methyl, ethyl, iso-propyl, n-propyl, n-butyl, isobutyl, sec-butyl, tert-butyl, cyclopentyl or cyclohexyl.

Components of this kind are preferably, for example, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxyacetic acid, hydroxypivalic acid, lactic acid, hydroxysuccinic acid, hydroxydecanoic acid, dimethylolpropionic acid, dimethylolbutyric acid, ethylenediaminetriacetic acid, hydroxydodecanoic acid, hydroxyhexadecanoic acid, 12-hydroxystearic acid, amino-naphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, N-cyclohexylaminopropanesulfonic acid, N-cyclohexylaminoethanesulfonic acid and also the alkali metal, alkaline earth metal or ammonium salts thereof and, with particular preference, the stated monohydroxycarboxylic and monohydroxysulfonic acids and also monoaminocarboxylic and monoaminosulfonic acids.

Very particular preference is given to dihydroxyalkylcarboxylic acids, especially those having 3 to 10 carbon atoms, as also described in U.S. Pat. No. 3,412,054. Of particular preference are compounds of the general formula

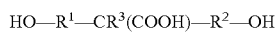

in which $R^1$ and $R^2$ are each a $C_1$- to $C_4$-alkanediyl unit and $R^3$ is a $C_1$- to $C_4$-alkyl unit. Of especial preference are dimethylolbutyric acid and particularly dimethylolpropionic acid (DMPA).

Also suitable are corresponding dihydroxysulfonic acids and dihydroxyphosphonic acids such as 2,3-dihydroxypropanephosphonic acid and also the corresponding acids in which at least one hydroxyl group has been replaced by an amino group, examples being those of the formula

in which $R^1$, $R^2$ and $R^3$ can have the same meanings as specified above.

Otherwise suitable are dihydroxy compounds having a molecular weight above 500 to 10 000 g/mol and at least 2 carboxylate groups, which are known from DE-A 4 140 486. They are obtainable by reacting dihydroxyl compounds with tetracarboxylic dianhydrides such as pyromellitic dianhydride or cyclopentanetetracarboxylic dianhydride in a molar ratio of 2:1 to 1.05:1 in a polyaddition reaction. Particularly suitable dihydroxy compounds are the monomers (b2) listed as chain extenders and also the diols (b1).

Potentially ionic hydrophilic groups are, in particular, those which can be converted by simple neutralization, hydrolysis or quaternization reactions into the above-mentioned ionic hydrophilic groups, examples thus being acid groups, anhydride groups or tertiary amino groups.

Ionic monomers (d) or potentially ionic monomers (d) are described in detail in, for example, Ullmanns Encyklopädie der technischen Chemie, 4th edition, Volume 19, pp. 311-313 and, for example, in DE-A 1 495 745.

Monomers having tertiary amino groups, in particular, are of special practical significance as potentially cationic monomers (d), examples being the following: tris(hydroxyalkyl) amines, N,N'-bis(hydroxyalkyl)alkylamines, N-hydroxyalkyldialkyl-amines, tris(aminoalkyl)amines, N,N'-bis(aminoalkyl)alkylamines and N-aminoalkyl-dialkylamines, the alkyl radicals and alkanediyl units of these tertiary amines consisting independently of one another of 2 to 6 carbons. Also suitable are polyethers containing tertiary nitrogen atoms and preferably two terminal hydroxyl groups, such as are obtainable in conventional manner by, for example, alkoxylating amines having two hydrogen atoms attached to amine nitrogen, examples being methylamine, aniline and N,N'-dimethylhydrazine. Polyethers of this kind generally have a molar weight of between 500 and 6000 g/mol.

These tertiary amines are converted either with acids, preferably strong mineral acids such as phosphoric acid, sulfuric acid or hydrohalic acids, or strong organic acids, such as formic, acetic or lactic acid, or by reaction with appropriate quaternizing agents such as $C_1$ to $C_6$ alkyl halides, bromides or chlorides for example, or di-$C_1$ to $C_6$ alkyl sulfates or di-$C_1$ to $C_6$ alkyl carbonates, into the ammonium salts.

Suitable monomers (d) having isocyanate-reactive amino groups include amino-carboxylic acids such as lysine, β-alanine, the adducts, specified in DE-A2034479, of aliphatic diprimary diamines with α,β-unsaturated carboxylic acids such as N-(2-amino-ethyl)-2-aminoethanecarboxylic acid, and also the corresponding N-aminoalkylamino-alkylcarboxylic acids, the alkanediyl units being composed of 2 to 6 carbon atoms.

Where monomers containing potentially ionic groups are used they can be converted into the ionic form before or during, but preferably after, the isocyanate polyaddition, since the ionic monomers are often only of very sparing solubility in the reaction mixture. With particular preference the anionic hydrophilic groups are in the form of their salts with an alkali metal ion or an ammonium ion as counterion.

Among these specified compounds, hydroxycarboxylic acids are preferred, particular preference being given to dihydroxyalkylcarboxylic acids and very particular preference to α,α-bis(hydroxymethyl)carboxylic acids, particularly dimethylolbutyric acid and dimethylolpropionic acid and especially dimethylolpropionic acid.

In one alternative embodiment the polyurethanes may comprise not only nonionic hydrophilic groups but also ionic hydrophilic groups, preferably nonionic hydrophilic groups and anionic hydrophilic groups simultaneously.

Within the field of polyurethane chemistry it is general knowledge how the molecular weight of the polyurethanes can be adjusted by choosing the fractions of the co-reactive monomers and by the arithmetic mean of the number of reactive functional groups per molecule.

Normally components (a), (b), (c) and (d) and their respective molar amounts are chosen such that the ratio A:B, where
A) is the molar amount of isocyanate groups and
B) is the sum of the molar amount of the hydroxyl groups and the molar amount of the functional groups which are able to react with isocyanates in an addition reaction
is 0.5:1 to 2:1, preferably 0.8:1 to 1.5 and more preferably 0.9:1 to 1.2:1. With very particular preference the ratio A:B is as close as possible to 1:1.

In addition to components (a), (b), (c) and (d) use is made of monomers containing only one reactive group generally in amounts of up to 15 mol %, preferably up to 8 mol %, based on the total amount of components (a), (b), (c) and (d).

The polyaddition of components (a) to (d) takes place in general at reaction temperatures of 20 to 180° C., preferably 50 to 150° C., under atmospheric pressure.

The reaction times required may extend from a few minutes to several hours. It is known within the field of polyurethane chemistry how the reaction time is influenced by a multiplicity of parameters such as temperature, monomer concentration and monomer reactivity.

For accelerating the reaction of the diisocyanates it is possible to use the conventional catalysts. Those suitable in principle are all catalysts commonly used in polyurethane chemistry.

These are, for example, organic amines, particularly tertiary aliphatic, cycloaliphatic or aromatic amines, and/or Lewis-acidic organometallic compounds. Examples of suitable Lewis-acidic organometallic compounds include tin compounds, such as tin(II) salts of organic carboxylic acids, such as tin(II) acetate, tin(II) octoate, tin(II) ethylhexoate and tin(II) laurate, and the dialkyltin(IV) salts of organic carboxylic acids, such as dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. Metal complexes such as acetylacetonates of iron, titanium, aluminum, zirconium, manganese, nickel and cobalt are also possible. Further metal catalysts are described by Blank et al. in Progress in Organic Coatings, 1999, Vol. 35, pages 19-29.

Preferred Lewis-acidic organometallic compounds are dimethyltin diacetate, dibutyltin dibutyrate, dibutyltin bis(2- ethylhexanoate), dibutyltin dilaurate, dioctyltin dilaurate, zirconium acetylacetonate and zirconium 2,2,6,6-tetramethyl-3,5-heptanedionate.

Bismuth and cobalt catalysts as well, and also cesium salts, can be used as catalysts. Suitable cesium salts include those compounds in which the following anions are used: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, n standing for the numbers 1 to 20.

Preference is given to cesium carboxylates where the anion conforms to the formulae $(C_nH_{2n-1}O_2)^-$ and $(C_{n+1}H_{2n-2}O_4)^{2-}$ with n being 1 to 20. Particularly preferred cesium salts contain monocarboxylate anions of the general formula $(C_nH_{2n-1}O_2)^-$, where n stands for numbers from 1 to 20. Mention may be made in particular here of the formate, acetate, propionate, hexanoate and 2-ethylhexanoate.

Suitable polymerization apparatus includes stirred tanks, particularly when solvents are used to ensure a low viscosity and effective heat removal.

If the reaction is carried out in bulk, suitable equipment, because of the generally high viscosities and the generally short reaction times, includes in particular extruders, especially self-cleaning multiscrew extruders.

In the prepolymer mixing technique a prepolymer which carries isocyanate groups is prepared first of all. In this case components (a) to (d) are chosen such that the above-defined ratio A:B is greater than 1.0 to 3, preferably 1.05 to 1.5. The prepolymer is first dispersed in water and is crosslinked simultaneously and/or subsequently by reacting the isocyanate groups with amines which carry more than 2 isocyanate-reactive amino groups, or is chain extended with amines which carry 2 isocyanate-reactive amino groups. Chain extension also takes place when no amine is added. In that case isocyanate groups are hydrolyzed to amine groups, which react with residual isocyanate groups of the prepolymers and so extend the chain.

The average particle size (z-average) as measured by means of dynamic light scattering with the Malvern® Autosizer 2 C of the polyurethane dispersions prepared in this way is not critical to the invention and is generally <1000 nm, preferably <500 nm, more preferably <200 nm and very preferably between 20 and below 200 nm.

The polyurethane dispersions generally have a solids content of 10% to 75%, preferably from 20% to 65%, by weight and a viscosity of 10 to 500 m Pas (ICI cone/plate viscometer with measuring head C in accordance with ASTM D4287), measured at a temperature of 20° C. and at a shear rate of $250\ s^{-1}$).

In accordance with the present invention, the free-radical polymerization takes place in the presence of the above-prepared polyurethane dispersions in such a way that two different monomer mixtures are polymerized in a manner such as to give polymer particles comprising at least two different phases, the monomer mixture (e) polymerized first having a glass transition temperature ($T_g$) of at least 50° C., preferably at least 60° C., and more preferably at least 70° C., and also an acid number of below 5 mg KOH/g, and the monomer mixture (f) polymerized last having a glass transition temperature ($T_g$) of not more than 20° C., preferably not more than 10° C., more preferably of not more than 0° C.

Calculating the glass transition temperature in accordance with known methods based on tabulated values for particular monomers, such as the method of Fox, for example, does not necessarily give different glass transition temperatures for the regions, if, for example, the monomers used include crosslinkers whose effect on the glass transition temperature cannot be accounted for arithmetically. For monomer mixtures without crosslinkers, however, calculating the glass transition temperature by the method of Fox may yield good approximation values.

The glass transition temperature $T_g$, is determined preferably in this specification in accordance with ASTM provision D3418-03, via Differential Scanning Calorimetry (DSC), preferably with a heating rate of 10° C./min.

The glass transition temperatures reported relate to polymers as obtained from the respective monomer mixtures (e) or (f), and not to the core-shell polymers in accordance with the present invention.

The first monomer mixture (e) may have a composition preferably as follows:

e1) at least 60%, preferably at least 70%, and more preferably at least 80% by weight and up to 100%, preferably up to 95%, and more preferably up to 90% by weight of at least one (cyclo)alkyl(meth)acrylate, e2) 0% by weight, preferably at least 5%, and more preferably at least 10% by weight and up to 40%, preferably up to 30%, and more preferably up to 20% by weight of at least one (meth)acrylate or (meth)acrylamide which carries at least one functional group, e3) 0% to 15%, preferably 0% to 10%, and more preferably 0% to 5% by weight of free-radically polymerizable monomers having precisely one free-radically polymerizable double bond and comprising at least one aromatic ring system, e4) optionally α,β-unsaturated carboxylic acids, in amounts such that the above-stated acid group content is not exceeded, preferably 0% by weight, and e5) 0% to 3%, preferably 0% to 1%, more preferably at least 0% to 0.5% by weight of at least one compound which has at least two free-radically polymerizable double bonds, with the proviso that the sum is always 100% by weight and that the glass transition temperature stated for this monomer mixture and the acid group content according to the invention are observed.

The second monomer mixture (f) may preferably have a composition as follows:

f1) at least 60%, preferably at least 70%, and more preferably at least 80% by weight and up to 100%, preferably up to 95%, and more preferably up to 90% by weight of at least one (cyclo)alkyl(meth)acrylate, f2) 0% by weight, preferably at least 5%, and more preferably at least 10% by weight and up to 40%, preferably up to 30%, and more preferably up to 20% by weight of at least one (meth)acrylate or (meth)acrylamide which carries at least one functional group, f3) 0% to 5%, preferably 0% to 3%, and more preferably 0% by weight of free-radically polymerizable monomers which comprise at least one aromatic ring system with precisely one free-radically polymerizable double bond, f4) optionally α,β-unsaturated carboxylic acids, in amounts such that the above-stated acid group content is not exceeded, and f5) 0% to 3%, preferably 0% to 1%, more preferably at least 0% to 0.5% by weight of at least one compound which has at least two free-radically polymerizable double bonds, with the proviso that the sum is always 100% by weight and that the glass transition temperature stated for this monomer mixture and the acid group content according to the invention are observed.

The (cyclo)alkyl(meth)acrylates (e1) and (f1) are, independently of one another, preferably $C_1$-$C_{20}$-alkyl(meth)acrylates or $C_5$-$C_{12}$-cycloalkyl(meth)acrylates.

Examples of alkyl(meth)acrylates include methyl(meth)acrylate, ethyl(meth)acrylate, n-propyl(meth)acrylate, n-butyl(meth)acrylate, isobutyl(meth)acrylate, sec-butyl(meth)acrylate, tert-butyl(meth)acrylate, n-pentyl(meth)acrylate, isopentyl(meth)acrylate, 2-methylbutyl(meth)acrylate, amyl(meth)acrylate, n-hexyl(meth)acrylate, 2-ethylbutyl(meth)acrylate, pentyl(meth)acrylate, n-heptyl(meth)acrylate, n-octyl(meth)acrylate, 2-ethylhexyl(meth)acrylate, 2-propylheptyl(meth)acrylate, n-decyl(meth)acrylate, undecyl(meth)acrylate, and n-dodecyl(meth)acrylate.

Cycloalkyl(meth)acrylates include cyclopentyl(meth)acrylate and cyclohexyl (meth)acrylate.

Preference is given to alkyl(meth)acrylates having a $C_1$-$C_{10}$-alkyl radical, more preferably methyl methacrylate, methyl acrylate, n-butyl acrylate, n-butyl methacrylate, n-hexyl acrylate, n-octyl acrylate, ethyl acrylate, tert-butyl (meth)acrylate, and 2-ethylhexyl acrylate.

Also suitable in particular are mixtures of the alkyl(meth)acrylates; for example, two to four, preferably two to three, and more preferably two.

Among the monomers (e1), preference is given in particular at least in part to methyl methacrylate in amounts such that the aforementioned glass transition temperature is attained.

Among the monomers (f1), preference is given in particular at least in part to n-butyl acrylate and/or 2-ethylhexyl acrylate in amounts such that the aforementioned glass transition temperature is attained.

The monomers (e2) and (f2) are, independently of one another, at least one (meth)acrylate or (meth)acrylamide which carries at least one, preferably one to three, more preferably one to two, and very preferably precisely one functional group.

The functional groups are preferably selected from the group consisting of $C_1$-$C_{10}$ alkyloxy groups, hydroxyl groups, primary amino groups, secondary amino groups, tertiary amino groups, carbamate groups, ureido groups, carbonyl groups, and epoxy groups, more preferably from the group consisting of hydroxyl groups, ureido groups, carbonyl groups, and epoxy groups.

Examples of alkoxyalkyl(meth)acrylates are, for example, 2-methoxyethyl(meth)acrylate, 2-ethoxyethyl(meth)acrylate, 4-methoxybutyl(meth)acrylate and 2-(2'-methoxyethoxy)ethyl(meth)acrylate.

Hydroxyalkyl(meth)acrylates are, for example, (meth)acrylic acid formal, hydroxymethyl(meth)acrylate, 2-hydroxyethyl(meth)acrylate, 2-hydroxypropyl(meth)acrylate, 3-hydroxypropyl(meth)acrylate, and 4-hydroxybutyl(meth)acrylate, preferably 2-hydroxyethyl(meth)acrylate, 2-hydroxypropyl(meth)acrylate, 3-hydroxypropyl(meth)acrylate, and 4-hydroxybutyl(meth)acrylate, more preferably 2-hydroxyethyl(meth)acrylate and 4-hydroxybutyl(meth)acrylate.

Examples of (meth)acrylates carrying epoxy groups are glycidyl(meth)acrylate and glycidyl crotonate.

(Meth)acrylates which carry carbonyl groups are, for example, 2'-(acetylacetoxy)ethyl methacrylate, acetoacetoxyethyl acrylate, acetoacetoxypropyl methacrylate, acetoacetoxybutyl methacrylate, 2'-(2"-oxoimidazolidin-1"-yl)ethyl methacrylate (ureidoethyl methacrylate), diacetoneacrylamide (DAAM) and diacetonemethacrylamide, preference being given to 2'-(acetylacetoxy)ethyl methacrylate, ureido ethyl methacrylate, and diacetoneacrylamide.

Preferred monomers (e2) are 2-hydroxyethyl acrylate, 4-hydroxybutyl acrylate, 2-hydroxyethyl methacrylate, ureidoethyl methacrylate, and diacetoneacrylamide.

Preferred monomer (f2) is glycidyl methacrylate, ureidoethyl methacrylate, and diacetoneacrylamide.

Monomers (e3) and (f3) are free-radically polymerizable monomers of the kind comprising at least one aromatic ring system.

Vinylaromatic compounds contemplated include styrene, vinyltoluene, vinylnaphthalene, α- and p-methylstyrene, α-butylstyrene, 4-n-butylstyrene, 4-n-decylstyrene, and, preferably, styrene.

α,β-Unsaturated carboxylic acids (e4) and (f4) are, for example, (meth)acrylic acid, crotonic acid, itaconic acid, maleic acid or fumaric acid. The acids may optionally be neutralized at least partially with ammonium, potassium and/or sodium.

(Meth)acrylic acid in this description stands for methacrylic acid and acrylic acid.

Crosslinkers (e5) and (f5) are those which have at least two free-radically polymerizable double bonds, preferably 2 to 6, more preferably 2 to 4, very preferably 2 to 3, and more particularly precisely 2.

With preference the free-radically polymerizable double bonds are selected from the group consisting of acrylate, methacrylate, allyl ether, and allyl ester.

Preferred monomers (e5) and (f5) are allyl acrylate, allyl methacrylate, methallyl acrylate, methallyl methacrylate, di- and poly(meth)acrylates, 1,2-, 1,3- and 1,4-butanediol diacrylate, 1,2- and 1,3-propylene glycol(meth)acrylate, 1,6-hexanediol di(meth)acrylate, 1,2-ethylene glycol di(meth)acrylate, neopentyl glycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri(meth)acrylate, pentaerythritol tri(meth)acrylate and tetra-(meth)acrylate, and divinylbenzene.

Particularly preferred monomers (e5) and (f5) are allyl acrylate, allyl methacrylate, 1,4-butanediol diacrylate, 1,6-hexanediol di(meth)acrylate, 1,2-ethylene glycol di(meth)acrylate, and divinylbenzene.

The weight ratio of the sum of the monomers (e) to the sum of the monomers (f) may range from 10:90 to 90:10, preferably from 20:80 to 80:20, more preferably from 30:70 to 70:30, very preferably from 40:60 to 60:40, and more particularly about 50:50.

The product obtained from the last stage generally has a particle size of 50 to 300 nm, preferably of 60 to 250, more preferably of 70 to 200 nm. The particle size for this product is considered to be the weight-average diameter of the polymer particles in the dispersion (determined in accordance with ISO 13321 using a High Performance Particle Sizer (HPPS) from Malvern at 22° C. and a wavelength of 633 nm).

It is an advantage of the present invention that there is no need for the presence of additional emulsifiers, dispersing assistants, and protective colloids.

Emulsifier are those compounds which are capable, by reducing the interfacial tension between an organic phase and an aqueous phase, of stabilizing a dispersion of these phases.

Polymerization initiators contemplated in the context of the present invention include redox initiator systems (I) comprising an oxidizing component (I1) and a reducing component (I2), with the capability to trigger a free-radical emulsion polymerization in aqueous media. They are used generally in amounts of 0.1% to 10% by weight, preferably of 0.2% to 4% by weight, based on the monomers.

Typical compounds (I1) are inorganic peroxides, examples being sodium and ammonium peroxydisulfate and hydrogen peroxide, organic peroxides such as dibenzoyl peroxide or tert-butyl hydroperoxide, and azo compounds such as azoisobutyronitrile.

Further examples include peroxodisulfates, examples being potassium, sodium or ammonium peroxodisulfate, peroxides, such as sodium peroxide or potassium peroxide, for example, perborates, such as ammonium, sodium or potassium perborate, for example, monopersulfates, examples being ammonium, sodium or potassium hydrogen monopersulfate, and also salts of peroxycarboxylic acids, examples being ammonium, sodium, potassium or magnesium monoperoxyphthalate, tert-butyl hydroperoxide, tert-amyl hydroperoxide, cumyl hydroperoxide, peracetic acid, perbenzoic acid, monoperphthalic acid or meta-chlorobenzoic acid, and also ketone peroxides, dialkyl peroxides, diacyl peroxides or mixed acyl alkyl peroxides. Examples of diacyl peroxides are dibenzoyl peroxide and diacetyl peroxide. Examples of dialkyl peroxides are di-tert-butyl peroxide, dicumyl peroxide, bis($\alpha,\alpha$-dimethylbenzyl)peroxide, and diethyl peroxide.

An example of mixed acyl alkyl peroxides is tert-butyl perbenzoate.

Ketone peroxides are, for example, acetone peroxide, butanone peroxide, and 1,1'-peroxybiscyclohexanol.

Mention may additionally be made, for example, of 1,2,4-trioxolane or 9,10-dihydro-9,10-epidioxidoanthracene.

Reducing coinitiators (I2) are preferably hydroxymethanesulfinic acid, isoascorbic acid, and ascorbic acid, and also the derivatives and salts of each of these, preferably the sodium salts, with particular preference being given to the use of ascorbic acid and the sodium salt of hydroxymethanesulfinic acid. The latter is available, for example, as Rongalit® C from BASF or as Bruggolit® FF6M from Brüggemann.

The at least one iron compound (F) preferably comprises iron(II) salts, more preferably complexed iron(II) salts, the complexing agent being possibly, for example, ethylenediamine tetraacetate or nitrilotriacetate and the sodium, potassium or ammonium salts thereof.

The preparation of aqueous polymer dispersions by the process of free-radical emulsion polymerization is known per se (cf. Houben-Weyl, Methoden der organischen Chemie, volume XIV, Makromolekulare Stoffe [Macromolecular compounds], loc. cit., pages 133ff).

One process which has been found particularly appropriate is a feed process in which the polyurethane (P1) and also at least part of the initiator (I1) are included in the initial charge and the polymerization is started by addition of the initiator (I2) and the monomer (e). Following complete or partial consumption of the monomers (e) by reaction, the monomer mixture (f) is then supplied and the polymerization is continued to the point of substantially complete conversion.

In another embodiment the polyurethane (P1) is introduced in the initial charge, and monomer mixture (e) and a part of the initiator (I1) are metered in simultaneously for starting. Following complete or partial consumption of the monomers (e) by reaction, the monomer mixture (f) is then supplied and the polymerization is continued up to a point of substantially complete conversion.

The reducing component (I2) of the initiator (I) is generally added shortly after the start of the addition of component (I1), but may also be added simultaneously with component (I1).

The sequence of the monomers (e) and (f) is dependent on whether the intention, between the individual shells, is to achieve a transition of the properties with a gradient, in which case the supplying of the monomer mixture (f) is commenced when there has already been partial conversion of the monomer mixture (e), or whether the monomer mixture (e) is caused to be consumed substantially by reaction first of all, the monomer mixture (f) being supplied only subsequently.

The monomers can be divided over a plurality of feeds and can be given a variable metering rate and/or a variable amount of one or more monomers.

Optionally it is also possible for molecular regulators (chain transfer agents) to be present. As a result of the presence of regulators in a polymerization, through chain termination and commencement of a new chain, the new free radical that is formed has the effect, generally, of reducing the molecular weight of the resultant polymer and, when crosslinkers are present, of also reducing the number of crosslinking sites (crosslinking density). If the concentration of regulator is increased in the course of a polymerization, then the crosslinking density is reduced further in the course of the polymerization.

Molecular weight regulators of this kind are known, and may be, for example, mercapto compounds, such as, preferably, tertiary dodecyl mercaptan, n-dodecyl mercaptan, isooctylmercaptopropionic acid, mercaptopropionic acid, dimeric $\alpha$-methylstyrene, 2-ethylhexyl thioglycolate (EHTG), 3-mercaptopropyltrimethoxysilane (MTMO) or terpinolene. The molecular weight regulators are known and are described in, for example, Houben-Weyl, Methoden der organischen Chemie, volume XIV/1, p. 297 ff., 1961, Stuttgart.

The polymerization is carried out in accordance with the invention at a temperature of not more than 85° C., preferably at 50 to 85° C., more preferably at 60 to 85° C.

The aqueous polymer dispersions obtained in this way preferably have a solids content of 30% to 65%, more preferably of 35% to 55% by weight.

The dispersions can be subjected to physical deodorization, if desired, following their preparation.

Physical deodorization may involve stripping the dispersion using steam, an oxygen-containing gas, preferably air, nitrogen or supercritical carbon dioxide in, for example, a stirred vessel, as described in DE-B 12 48 943, or in a countercurrent column, as described in DE-A 196 21 027.

The dispersions of the invention are suitable advantageously for coating and impregnating substrates. Suitable substrates are wood, wood veneer, paper, paperboard, cardboard, textile, leather, nonwoven, surfaces of plastics, glass, ceramic, mineral building materials, and metals, including coated metals.

In one preferred embodiment the dispersions of the invention are used for coating wood and wood veneer, more preferably wood.

The possibilities include the use for wood in exterior or interior applications, preferably in exterior applications.

Examples of exterior wood applications are, for example, doors and windows.

Examples of interior wood applications are, for example, woodblock flooring and furniture, and also carpentry and joinery applications.

Examples of wood substrates are oak, spruce, pine, beech, maple, chestnut, plane, robinia, ash, birch, Scots pine, meranti, and elm, and also cork.

The dispersions prepared in accordance with the invention are mixed with other components typical for the cited applications, examples being surfactants, detergents, dyes, pigments, fillers or light stabilizers.

The present invention further provides coating compositions comprising at least one polymer dispersion of the invention, and also articles coated therewith.

The binder compositions of the invention are employed preferably in aqueous coating materials. These coating materials take the form, for example, of an unpigmented system (transparent varnish) or of a pigmented system. The fraction of the pigments can be described by the pigment volume concentration (PVC). The PVC describes the ratio of the volume of pigments ($V_P$) and fillers ($V_F$) to the total volume, composed of the volumes of binder ($V_B$), pigments, and fillers of a dried coating film, in percent: $PVC=(V_P+V_F)\times 100/(V_P+V_F+V_B)$. Coating materials can be divided on the basis of the PVC, for example, as follows:

| | |
|---|---|
| highly filled interior paint, wash resistant, white/matt | about 85 |
| interior paint, scrub resistant, white/matt | about 80 |
| semigloss paint, silk-matt | about 35 |
| semigloss paint, silk-gloss | about 25 |
| high-gloss paint | about 15-25 |
| exterior masonry paint, white | about 45-55 |
| transparent varnish | <5 |

These dispersions are used preferably in PVC <50, more preferably PVC <35, and more preferably still in low-filter systems (PVC <25) and transparent varnishes (PVC <5).

Suitable fillers in transparent varnish systems are, for example, matting agents, which thus, desirably, significantly detract from the gloss. Matting agents are generally transparent and may both be organic and be inorganic. Inorganic fillers based on silica are most suitable and are widely available commercially. Examples are the Syloid® products from W.R. Grace & Company and the Acematt® products from Evonik GmbH. Organic matting agents are available, for example, from BYK-Chemie GmbH under the Ceraflour® and Ceramat® brands, and from Deuteron GmbH under the Deuteron MK® brand. Other suitable fillers for emulsion paints are, for example, aluminosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc. Finely divided fillers are of course preferred in coating materials. The fillers can be used as individual components. In actual practice, however, filler mixtures have proven particularly appropriate, examples being calcium carbonate/kaolin and calcium carbonate/talc. Glossy coating materials generally include only small amounts of very finely divided fillers, or contain no fillers.

Finely divided fillers may also be used to increase the hiding power and/or to save on the use of white pigments. For the adjustment of the hiding power of the hue and of the depth of color it is preferred to use blends of color pigments and fillers.

Examples of suitable pigments include inorganic white pigments such as titanium dioxide, preferably in the rutile form, barium sulfate, zinc oxide, zinc sulfide, basic lead carbonate, antimony trioxide, lithopones (zinc sulfide+barium sulfate), or colored pigments, for example iron oxides, carbon black, graphite, zinc yellow, zinc green, ultramarine, manganese black, antimony black, manganese violet, Paris blue or Schweinfurt green. Besides the inorganic pigments the emulsion paints of the invention may also comprise organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone, and metal complex pigments. Also suitable are synthetic white pigments with air inclusions to increase the light scattering, such as the Ropaque® and AQACell® dispersions. Also suitable are the Luconyl® products from BASF SE, such as Lyconyl® Yellow, Luconyl® Brown and Luconyl® Red, for example, especially the transparent versions.

The coating composition of the invention (aqueous coating material) may, besides the polymer dispersion, optionally comprise additional film-forming polymers, pigment, and further auxiliaries.

The customary auxiliaries include wetting agents or dispersants, such as sodium, potassium or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof.

More important are the film-forming assistants, the thickeners and defoamers. Examples of suitable film-forming assistants are Texanol® from Eastman Chemicals and the glycol ethers and glycol esters available commercially, for example, from BASF SE, under the names Solvenon® and Lusolvan®, and from Dow under the trade name Dowanol®. The amount is preferably <10% by weight and more preferably <5% by weight, based on the formulation as a whole. It is also possible to formulate entirely without solvents.

Further suitable auxiliaries are flow control agents, defoamers, biocides, and thickeners. Suitable thickeners are, for example, associative thickeners, such as polyurethane thickeners. The amount of the thickener is preferably less than 2.5% by weight, more preferably less than 1.5% by weight, of thickener, based on the solids content of the coating material. Further formulating information for wood coatings is described comprehensively in "Water-based acrylates for decorative coatings" by the authors M. Schwartz and R. Baumstark, ISBN 3-87870-726-6.

The coating materials of the invention are produced in a known way by blending the components in mixing apparatus customary for this purpose. It has been found appropriate to prepare an aqueous paste or dispersion from the pigments, water, and, optionally, the auxiliaries, and only then to mix the polymeric binder, i.e., in general, the aqueous dispersion of the polymer, with the pigment paste or pigment dispersion.

The coating material of the invention may be applied to substrates in a typical way, as for example by spreading, spraying, dipping, rolling, knife coating.

Percentage and ppm figures used in this specification relate, unless otherwise indicated, to weight percentages and ppm by weight.

EXAMPLES

A polyurethane PU-I was prepared as follows:

392 g (0.196 mol) of a polyesterol with an OH number of 56, prepared from an equimolar mixture of adipic acid and isophthalic acid and hexane-1,6-diol, 39.4 g (0.294 mol) of dimethylolpropionic acid, 70.6 g (0.784 mol) of butane-1,4-diol, and 98 g of acetone were introduced in a pressure apparatus and heated to 45° C. 339.2 g (1.526 mol) of isophorone diisocyanate were added and the mixture was stirred at 90° C. for four hours. It was then diluted with 800 g of acetone, let down to atmospheric pressure, and cooled to 35° C. The NCO content of the solution was determined as being 1.4% by weight.

Following addition of 3.9 g (0.0229 mol) of isophoronediamine and 31.0 g (0.2646 mol) of diethylethanolamine, dispersion took place using 1260 g of water over the course of 10 minutes. Immediately thereafter a mixture of 10.5 g (0.1022 mol) of diethylenetriamine, 98 g of water, and 250 g of water was added and the acetone was thereafter removed by distillation.

This gave an aqueous polyurethane dispersion with 38% solids content.

As polyurethane PU-II, a commercial product from BASF SE, Ludwigshafen, was used. PU-II is a polyether-based aliphatic polyurethane dispersion (BASF, with a particle size of 70 nm (measured by light scattering)), based on isophorone diisocyanate and a polyalkylene glycol, having a weight-average molar weight of 4000 g/mol and a particle size of 70 nm (measured by light scattering).

A polyacrylate dispersion PA-I was prepared as follows:

A polymerization vessel equipped with metering devices and temperature regulation was charged at 20 to 25° C. (room temperature) under a nitrogen atmosphere with 200.8 g of deionized water and
35.0 g of a 15% strength by weight aqueous solution of sodium lauryl sulfate and this initial charge was heated to 87° C. with stirring. When this temperature had been reached, 29.8 g of feed 1 and subsequently, with the temperature maintained, 2.0 g of feed 3 were added and polymerization took place for 5 minutes. Thereafter, beginning simultaneously, the remainder of feed 1 was metered in over the course of 120 minutes and, in parallel therewith, the remainder of feed 3 was metered in over the course of 165 minutes, the feeds taking place with constant flow rates and continuously. After the end of feed 1, feed 2 was commenced and was metered in continuously at a constant flow rate over the course of 45 minutes.

Feed 1 (homogeneous mixture of):

| | |
|---|---|
| 329.1 g | of deionized water |
| 23.3 g | of a 15% strength by weight aqueous solution of sodium lauryl sulfate |
| 5.7 g | of a 50% strength by weight aqueous solution of acrylamide |
| 5.1 g | of acrylic acid |
| 27.0 g | of a 25% strength by weight solution of ureidomethacrylate in methyl methacrylate (Plex ® 6844-O from Röhm GmbH) |
| 199.2 g | of methyl methacrylate and |
| 285.5 g | of 2-ethylhexyl acrylate |

Feed 2 (homogeneous mixture of):

| | |
|---|---|
| 174.4 g | of deionized water |
| 8.9 g | of a 15% strength by weight aqueous solution of sodium lauryl sulfate |
| 5.1 g | of acrylic acid |
| 27.0 g | of a 25% strength by weight solution of ureidomethacrylate in methyl methacrylate (Plex ® 6844-O from Röhm GmbH) and |
| 148.2 g | of methyl methacrylate |

Feed 3 (homogenous mixture of):

| | |
|---|---|
| 13.0 g | of deionized water and |
| 1.0 g | of sodium peroxodisulfate |

After the end of feeds 2 and 3, the polymerization mixture was reacted further at 87° C. for 30 minutes more. Following this, 22.4 g of a 5% strength by weight aqueous hydrogen peroxide solution, and a solution of 1.0 g of ascorbic acid and 26.5 g of deionized water, were metered in continuously at constant flow rates over the course of 60 minutes, beginning simultaneously, via separate feed lines, in the polymerization mixture.

The aqueous polymerization dispersion obtained was subsequently cooled to room temperature, neutralized with 5.9 g of a 25% strength by weight aqueous ammonia solution, and filtered through a 125 μm filter.

The resulting 1544 g of the aqueous polymer dispersion had a solids content of 44.7% by weight. The MFFT was 13° C. The aqueous polymer dispersion, diluted with deionized water, had a particle diameter of 95 nm as determined by means of dynamic light scattering. The glass transition temperature of the first stage, measured by DSC, was −5° C., and that of the second stage 105° C.

Comparative Example 1

A polymerization vessel equipped with metering devices and temperature regulation was charged at 20 to 25° C. (room temperature) under a nitrogen atmosphere with

| | |
|---|---|
| 105.7 g | of deionized water and |
| 209.3 g | of the above-prepared PU-I | and this initial charge was heated to 85° C. with stirring. When this temperature had been reached, 24.0 g of a 10% strength by weight aqueous solution of tert-butyl hydroperoxide solution and 40.0 g of water were added.

Subsequently, with the temperature maintained, 63.6 g of a 2.87% strength aqueous solution of Rongalit C (sodium salt of hydroxymethanesulfinic acid, BASF) were metered in continuously at a constant flow rate over the course of 140 minutes. Five minutes after the beginning of the Rongalit C feed, 89.6 of styrene were metered in continuously in parallel with a constant flow rate over the course of 40 minutes to the polymerization mixture. Ten minutes after the end of the styrene feed, feed 2 was metered in continuously at a constant flow rate over the course of 40 minutes.

After the end of feed 2, the polymerization mixture was left to react further at 85° C. for 30 minutes.

The aqueous polymer dispersion obtained was subsequently cooled to room temperature and filtered through a 125 μm filter.

Feed 2 (homogeneous mixture of):

| | |
|---|---|
| 3.36 g | of glycidyl methacrylate |
| 3.36 g | of hydroxyethyl acrylate |
| 43.10 g | of methyl methacrylate |
| 28.56 g | of butyl acrylate |

The aqueous polymer dispersion obtained had a solids content of 40.1% by weight. In the course of the synthesis, more than 2 g of brittle coagulum were formed on the glass walls and stirrer.

Inventive Example 1

A polymerization vessel equipped with metering devices and temperature regulation was charged at 20 to 25° C. (room temperature) under a nitrogen atmosphere with

| | |
|---|---|
| 206.3 g | of deionized water and |
| 194.6 g | of the above-prepared PU-I, and |
| 4.8 g | of a 0.5% strength aqueous solution of Dissolvine ® E-FE6 (iron potassium ethylenediamine tetraacetate complex, Akzo) | and this initial charge was heated to 60° C. with stirring. When this temperature had been reached, 3.0 g of a 10% strength by weight aqueous solution of tert-butyl hydroperoxide solution and 5.0 g of water were added.

Subsequently, with the temperature maintained, 7.9 g of a 2.87% strength aqueous solution of Rongalit C (BASF) were metered in continuously at a constant flow rate over the course of 140 minutes. Five minutes after the beginning of the Rongalit C feed, feed 1 was metered in continuously in parallel with a constant flow rate over the course of 40 minutes to the polymerization mixture. Ten minutes after the end of feed 1, feed 2 was metered in continuously at a constant flow rate over the course of 40 minutes.

After the end of feed 2, the polymerization mixture was left to react further at 60° C. for 30 minutes.

The aqueous polymer dispersion obtained was subsequently cooled to room temperature, admixed with 2.02 g of adipic dihydrazide in 14.8 g of water, and filtered through a 125 µm filter.

Feed 1 (homogeneous mixture of):

| | |
|---|---|
| 4.03 g | of diacetoneacrylamide |
| 4.03 g | of butanediol monoacrylate |
| 5.04 g | of butyl acrylate |
| 5.04 g | of styrene |
| 32.26 g | of methyl methacrylate |

Feed 2 (homogeneous mixture of):

| | |
|---|---|
| 81.31 g | of butyl acrylate |
| 36.29 g | of methyl methacrylate |

The aqueous polymer dispersion obtained had a solids content of 40.6% by weight, a particle size of 133 nm (determined by High Performance Particle Sizer, HPPS), and a minimum film-forming temperature of 10° C. With this mode of reaction regime, less than 0.1 g of coagulum was formed in the dispersion.

Comparative Example 2

A polymerization vessel equipped with metering devices and temperature regulation was charged at 20 to 25° C. (room temperature) under a nitrogen atmosphere with

| | |
|---|---|
| 127.5 g | of deionized water and |
| 324.3 g | of the above-prepared PU-I | and this initial charge was heated to 85° C. with stirring (150 revolutions per minute, anchor stirrer). When this temperature had been reached, 17.1 g of a 7% strength by weight aqueous solution of sodium peroxodisulfate were added.

Two minutes after this addition, with the temperature maintained, 60.0 g of methyl methacrylate was metered in (feed 1) continuously at a constant flow rate over the course of 70 minutes to the polymerization mixture. Subsequently, feed 2 was metered in continuously at a constant flow rate over the course of 70 minutes.

After the end of feed 2, the polymerization mixture was left to react further at 85° C. for 90 minutes.

The aqueous polymer dispersion obtained was subsequently cooled to room temperature, admixed with 2.4 g of adipic dihydrazide in 17.6 g of deionized water, and filtered through a 125 µm filter.

Feed 2 (homogeneous mixture of):

| | |
|---|---|
| 4.80 g | of diacetoneacrylamide |
| 37.20 g | of methyl methacrylate |
| 18.0 g | of n-butyl methacrylate |

The aqueous polymer dispersion obtained had a solids content of 39.1% by weight. In the course of the synthesis, a total of more than 8 g of brittle coagulum were formed on the glass walls, on the stirrer, and in the dispersion.

Comparative Example 3

A polymerization vessel equipped with metering devices and temperature regulation was charged at 20 to 25° C. (room temperature) under a nitrogen atmosphere with

| | |
|---|---|
| 0.17 g | of deionized water and |
| 348.8 g | of the above-prepared PU-I | and this initial charge was heated to 85° C. with stirring (150 revolutions per minute, anchor stirrer). When this temperature had been reached, 64.0 g of a 3.75% strength by weight aqueous solution of t-butyl hydroperoxide were added.

Following this addition, the metered addition of 63.55 g of a 2.87% strength aqueous solution of Rongalit C, continuously and at a constant flow rate over the course of 140 minutes, was commenced simultaneously with the metered addition (feed 1), at a uniform rate over the course of 40 minutes, of a mixture of 12.0 g of butanediol diacrylate with 72.0 g of styrene to the polymerization mixture, during which the temperature was maintained. After the end of feed 1, feed 2 was metered in continuously at a constant flow rate over the course of 40 minutes.

After the end of feed 2, the polymerization mixture was left to react further at 85° C. for 90 minutes.

The aqueous polymer dispersion obtained was subsequently cooled to room temperature, admixed with 2.4 g of adipic dihydrazide in 17.6 g of deionized water, and filtered through a 125 µm filter.

Feed 2 (homogeneous mixture of):

| | |
|---|---|
| 4.80 g | of diacetoneacrylamide |
| 31.20 g | of ethyl acrylate |

The aqueous polymer dispersion obtained had a solids content of 40.0% by weight. In the course of the synthesis, a total of more than 6 g of coagulum were formed on the glass walls, on the stirrer, and in the dispersion.

Inventive Example 2

A polymerization vessel equipped with metering devices and temperature regulation was charged at 20 to 25° C. (room temperature) under a nitrogen atmosphere with

| | |
|---|---|
| 138.7 g | of deionized water and |
| 324.3 g | of the above-prepared PU-I and |
| 2.4 g | of a 1% strength aqueous solution of Dissolvine E-FE6 (Akzo) | and this initial charge was heated to 60° C. with stirring. When this temperature had been reached, 3.0 g of a 10% strength by weight aqueous solution of tert-butyl hydroperoxide solution and 5.0 g of water were added.

Subsequently, with the temperature maintained, 7.9 g of a 2.87% strength aqueous solution of Rongalit C (BASF) were metered in continuously at a constant flow rate over the course of 140 minutes. Five minutes after the beginning of the Rongalit C feed, feed 1 was metered in continuously in parallel with a constant flow rate over the course of 40 minutes to the polymerization mixture. Ten minutes after the end of feed 1, feed 2 was metered in continuously at a constant flow rate over the course of 40 minutes.

After the end of feed 2, the polymerization mixture was left to react further at 60° C. for 30 minutes.

The aqueous polymer dispersion obtained was subsequently cooled to room temperature, and filtered through a 125 μm filter.

Feed 1:

| | |
|---|---|
| 47.4 g | of methyl methacrylate |

Feed 2 (homogeneous mixture of):

| | |
|---|---|
| 4.8 g | of glycidyl methacrylate |
| 67.8 g | of n-butyl acrylate |

The aqueous polymer dispersion obtained had a solids content of 40.5% by weight, a particle size of 151 nm (HPPS), and a minimum film-forming temperature of 16° C. With this mode of reaction regime, less than 0.1 g of coagulum was formed in the dispersion.

Inventive Example 3

A polymerization vessel equipped with metering devices and temperature regulation was charged at 20 to 25° C. (room temperature) under a nitrogen atmosphere with

| | |
|---|---|
| 218.0 g | of deionized water and |
| 194.6 g | of the above-prepared PU-I and |
| 4.8 g | of a 0.5% strength aqueous solution of Dissolvine E-FE6 (Akzo) | and this initial charge was heated to 60° C. with stirring. When this temperature had been reached, 3.0 g of a 10% strength by weight aqueous solution of tert-butyl hydroperoxide solution and 5.0 g of water were added.

Subsequently, with the temperature maintained, 7.9 g of a 2.87% strength aqueous solution of Rongalit C (BASF) were metered in continuously at a constant flow rate over the course of 140 minutes. Five minutes after the beginning of the Rongalit C feed, feed 1 was metered in continuously in parallel with a constant flow rate over the course of 40 minutes to the polymerization mixture. Ten minutes after the end of feed 1, feed 2 was metered in continuously at a constant flow rate over the course of 40 minutes.

After the end of feed 2, the polymerization mixture was left to react further at 60° C. for 30 minutes.

The aqueous polymer dispersion obtained was subsequently cooled to room temperature, and filtered through a 125 μm filter.

Feed 1 (homogeneous mixture of):

| | |
|---|---|
| 0.72 g | of allyl methacrylate |
| 4.03 g | of butanediol monoacrylate |
| 4.32 g | of butyl acrylate |
| 5.04 g | of styrene |
| 32.29 g | of methyl methacrylate |

Feed 2 (homogeneous mixture of):

| | |
|---|---|
| 81.31 g | of butyl acrylate |
| 36.29 g | of methyl methacrylate |

The aqueous polymer dispersion obtained had a solids content of 40.7% by weight, a particle size of 135 nm (HPPS), and a minimum film-forming temperature of 4° C. With this mode of reaction regime, less than 0.1 g of coagulum was formed in the dispersion.

Inventive Example 4

Polyurethane/polyacrylate hybrid dispersion on PU-II

A polymerization vessel equipped with metering devices and temperature regulation was charged at 20 to 25° C. (room temperature) under a nitrogen atmosphere with

| | |
|---|---|
| 296.9 g | of deionized water and |
| 387.1 g | of the above-described PU-II and |
| 9.6 g | of a 0.5% strength aqueous solution of Dissolvine ® E-FE6 (iron potassium ethylenediaminetetraacetate complex, Akzo) | and this initial charge was heated to 70° C. with stirring. When this temperature had been reached, 9.6 g of a 10% strength by weight aqueous solution of tert-butyl hydroperoxide solution were added.

Subsequently, with the temperature maintained, a mixture of 0.48 g of Lutavit C (ascorbic acid, BASF) in 21.0 g of water with 0.25 g of a 25% strength by weight aqueous solution of ammonia was metered in continuously at a constant flow rate over the course of 180 minutes. Five minutes after the beginning of the feed of the ammonical Lutavit C solution, feed 1 was metered in continuously in parallel, with a constant flow rate over the course of 40 minutes, to the polymerization mixture. Ten minutes after the end of feed 1, feed 2 was metered in continuously with a constant flow rate over the course of 80 minutes.

After the end of feed 2, 20.6 g of deionized water were added and the polymerization mixture was left to react further at 70° C. for 30 minutes more.

The aqueous polymer dispersion obtained was subsequently cooled to room temperature, admixed with 4.03 g of adipic dihydrazide in 29.6 g of water, and filtered through a 125 μm filter.

Feed 1 (homogeneous mixture of):

| | |
|---|---|
| 8.06 g | of diacetoneacrylamide |
| 8.06 g | of butanediol monoacrylate |
| 10.08 g | of butyl acrylate |
| 10.08 g | of styrene |
| 64.51 g | of methyl methacrylate |

Feed 2 (homogeneous mixture of):

| | |
|---|---|
| 162.60 g | of butyl acrylate |
| 72.58 g | of methyl methacrylate |
| 41.13 g | of deionized water |

The aqueous polymer dispersion obtained had a solids content of 42.3% by weight, a particle size of 91 nm (determined by High Performance Particle Sizer, HPPS), and a minimum film-forming temperature of 0° C. With this mode of reaction regime, less than 0.8 g of coagulum was formed in the dispersion.

Performance tests:

a) Blocking Resistance Test

To produce the test elements in a method based on EN927-6, section 5, 6 wooden strips made from pinewood (150×50×5 mm) are placed alongside one another and, using an Erichsen applicator, are coated centrally from left to right with the test stain in a wet film thickness of 300 μm. Only strips 2 to 5 are needed.

After 24 hours of drying at room temperature, pairs of strips are placed crosswise against one another with the coated sides facing. The test specimens are subsequently weighted with specific 10 kg weights (corresponding to a load of approximately 400 g/cm$^2$) and are stored under these conditions at 50° C. for 24 hours. After cooling, the test specimens are separated from one another.

The evaluation takes place in each case according to the following criteria:
bonding, blocking, film potholing
0=slight removal of the coated bases from one another without damage (loosely abutting)
1=slight sticking; separation accomplishable without damage to coating
2=moderate sticking; separation of the coating film is possible; slight adhesion traces and impression traces are present.
3=blocking: stress whitening in the coating, but no film tearing
4=blocking: stress whitening and slight film tearing
5=blocking: complete blocking, severe film tearing b) Water Whitening Test The test stain is applied to glass in a wet film thickness of 300 μm using an Erichsen applicator. After drying at room temperature for 24 hours, the glass plate is immersed into a beaker containing distilled water. A black sheet is placed behind the beaker so as to maximize the contrast. The clouding of the stain is monitored optically over time, and evaluation takes place after 2 hours of water contact, using ratings from 0 to 5, where:

0=no whitening visible

5=completely whitened stain, no longer transparent c) Low-Temperature Elasticity The test stain or paint is applied to a flat, Teflonized aluminum plate in a wet film thickness of 1000 μm, using an Erichsen applicator. After 7 days of drying at room temperature, the free film is taken from the plate and dried in vertical suspension for a further 21 days. Following this period, test specimens according to DIN ISO 1184 are punched from the film. These test specimens are stored at 0 degrees Celsius for 24 hours and clamped into a Zwick instrument, which has been placed in a conditioning cabinet at 50% atmospheric humidity and 0 degrees Celsius, for the examination of elongation at break. Drawing speed is set at 200 mm/min. The average value of the elongation at break is determined on 5 test specimens per free film.

The stain was prepared according to the formula below, in a PE beaker, with the aid of a Dispermat. The solids content of the stain was kept constant by adapting the amount of water to the solids content of the binder.

|  |  |  | Parts by weight |
|---|---|---|---|
| Water (fully demineralized) |  |  | 100 |
| Byk ® 348 | Wetting agent from BYK-Chemie GmbH |  | 2 |
| Tego ® Airex 901 W | Defoamer from Evonik GmbH |  | 4 |
| Solvenon ® DPM | Film-forming assistant from BASF SE | Solvent and Tinuvin were premixed | 10 |
| Butyl glycol | Film-forming assistant |  | 15 |
| Tinuvin ® 1130 | Light stabilizer from BASF SE |  | 5 |
| Cognis DSX3290 | Thickener from BASF SE | 34% | 11 |
| Cognis DSX3100 | Thickener from BASF SE | 18% | 3 |
| Ammonia | Neutralizing agent (25% strength) |  | 2 |
| SYLOID ® W 500 Dispersing for 20 min at 1500 rpm | Filler from W.R. Grace & Company |  | 15 |
| Dispersion PA-I |  | 44.7% | 762 |
| Tego ® Foamex 810 | Defoamer from Evonik GmbH |  | 4 |
| Water (fully demineralized) |  |  | 71 |
| total |  |  | 1000 |

In these formulations, instead of PA-I, the constituents listed in the table below were used analogously and tested according to test methods a) and b). The simultaneous improvement in blocking resistance and resistance to water whitening is clearly apparent for the inventive example 2 dispersion

| Dispersion | Blocking resistance | Resistance to water whitening |
|---|---|---|
| PA-I | 4 | 3 |
| PU-I | 5 | 3 |
| Example 2 | 0.5 | 0.5 |

Dispersions were also tested in a paint formulation with a PVC=18, for blocking behavior and low-temperature elasticity. The paint formulation was prepared as follows:

|  |  |  | Parts by weight |
|---|---|---|---|
| Water (fully demineralized) |  |  | 50 |
| Byk ® 348 | Wetting agent from BYK-Chemie GmbH |  | 1 |
| Tego ® Airex 901 W | Defoamer from Evonik GmbH |  | 2 |
| AMP90 | Neutralizing agent from Angus GmbH |  | 2 |
| Pigmentverteiler AB30 | Dispersing assistant from BASF SE | 30% | 11 |
| TiO2 R706 | White pigment from DuPont |  | 230 |
| Dispersing for 20 min at 1500 rpm |  |  |  |
| Dispersion PA-I |  | 44.7% | 604 |
| Cognis DSX3100 | Thickener from BASF SE | 18% | 8 |
| Texanol | Film-forming assistant from Eastman |  | 10 |
| Butyl diglycol | Film-forming assistant from BASF SE |  | 10 |
| Foamstar ® A38 | Defoamer from BASF SE |  | 3 |
| Water (fully demineralized) |  |  | 69 |
| total |  |  | 1000 |

The following dispersions were used in this formulation: PA-I, PU-II, example 2, and example 4. They were tested by test methods a) and c). Clearly apparent here is the simultaneous improvement in blocking resistance and low-temperature elasticity for the inventive examples, with example 4 giving the best tradeoff.

| Dispersion | Blocking resistance | Low-temperature elasticity |
|---|---|---|
| PA-I | 2 | 10% |
| PU-II | 5 | 370% |
| Example 2 | 0.5 | 30% |
| Example 4 | 0.5 | 210% |

The invention claimed is:

1. A polyurethane-polyacrylate hybrid dispersion obtained by two-stage free-radical polymerization of ethylenically unsaturated compounds in the presence of a polyurethane (P1), wherein the polymerization comprises:
   subjecting, in a first stage, an ethylenically unsaturated compound (e) to at least partial free-radical polymerization in the presence of the polyurethane (P1), a redox initiator system (I), and an iron compound (F); and
   subsequently subjecting, in a second stage, an ethylenically unsaturated compound (f) to free-radical polymerization,
   wherein:
   the polyurethane (P1) comprises exclusively aliphatic isocyanates, cycloaliphatic isocyanates, or both, as synthesis components, and has an at least partially neutralized acid group content of less than 500 mmol per kg of polyurethane;
   the ethylenically unsaturated compound (e) of the first stage has a glass transition temperature of at least 50° C., and comprises:
   e1) from 60% to 95% by weight of a (cyclo)alkyl (meth) acrylate; and
   e2) from 5% to 40% by weight of a (meth)acrylate or (meth)acrylamide comprising a functional group, based on a total sum of 100% by weight;
   the ethylenically unsaturated compound (f) of the second stage has a glass transition temperature of up to 20° C;
   a weight ratio of polyurethane (P1) to a sum of the ethylenically unsaturated compounds (e) and (f) of the first and second stages is from 50:50 to 10:90; and
   a temperature during the free-radical polymerization is not more than 85° C.

2. The dispersion according to claim 1, wherein the polyurethane (P1) is obtained by a process comprising:
   preparing a polyurethane by reacting
   a) a polyfunctional isocyanate having 4 to 30 C atoms,
   b) a diol,
   c) optionally a further polyfunctional compound different from the diol, and
   d) a monomer different from the polyfunctional isocyanate, the diol, and the polyfunctional compound,
   to obtain the polyurethane in the presence of a solvent;
   subsequently dispersing the polyurethane in water; and
   optionally adding polyamines before the dispersing, during the dispersing, after the dispersing, or any combination thereof,
   wherein:
   10 to 100 mol % of the diol b), based on a total amount of the diol b), comprises a diol b1) having a molecular weight of from 500 to 5000;
   0 to 90 mol % of the diol b), based on a total amount of the diol b), comprises a diol b2) having a molecular weight of from 60 to 500 g/mol;
   the optionally further polyfunctional compound c), comprises a reactive group which is an alcoholic hydroxyl group or primary or secondary amino group; and
   the monomer d) comprises an isocyanate group or a group which is reactive toward an isocyanate group, and additionally comprises a hydrophilic group or potentially hydrophilic group which renders the polyurethane dispersible in water.

3. The dispersion according to claim 2, wherein the polyfunctional isocyanate a) is selected from the group consisting of 1,6-hexamethylene diisocyanate and isophorone diisocyanate.

4. The dispersion according to claim 2, wherein the diol b1) comprises a polyester comprising as a synthesis component a 1,2- or 1,3-disubstituted cyclic dicarboxylic acid in incorporated form.

5. The dispersion according to claim 1, wherein the ethylenically unsaturated compound (e) comprises:
   e1) from 60% to 90% by weight of the (cyclo)alkyl (meth) acrylate;

e2) from 10% to 40% by weight of the (meth)acrylate or the (meth)acrylamide comprising the functional group;

e3) from 0% to 15% by weight of a free-radically polymerizable monomer having precisely one free-radically polymerizable double bond and comprising an aromatic ring system;

e4) optionally an α,β-unsaturated carboxylic acid; and e5) from 0% to 3% by weight of a compound having at least two free-radically polymerizable double bonds, based on a total sum of 100% by weight.

6. The dispersion according to claim 1, wherein the ethylenically unsaturated compound (f) comprises:

f1) from 60% to 100% by weight of a (cyclo)alkyl (meth)acrylate;

f2) from 0% to 40% by weight of a (meth)acrylate or (meth)acrylamide which carries a functional group;

f3) from 0% to 5% by weight of a free-radically polymerizable monomer which comprises an aromatic ring system with precisely one free-radically polymerizable double bond;

f4) optionally an α,β-unsaturated carboxylic acid; and f5) from 0% to 3% by weight of a compound having at least two free-radically polymerizable double bonds, based on a total sum of 100% by weight.

7. The dispersion according to claim 5, wherein the monomer e1) is at least in part methyl methacrylate.

8. The dispersion according to claim 6, wherein the monomer f1) comprises n-butyl acrylate, 2-ethylhexyl acrylate, or both.

9. The dispersion according to claim 5, wherein the monomer e2) is selected from the group consisting of 2-hydroxyethyl acrylate, 4-hydroxy butyl acrylate, 2-hydroxyethyl methacrylate, ureidoethyl methacrylate, and diacetoneacrylamide.

10. The dispersion according to claim 6, wherein the ethylenically unsaturated compound (f) comprises, as the monomer f2), glycidyl methacrylate, ureidoethyl methacrylate or diacetoneacrylamide.

11. A method of coating or impregnating a substrate, the method comprising coating or impregnating the substrate with the polyurethane-polyacrylate hybrid dispersion according to claim 1.

12. The method according to claim 11, wherein the substrate is selected from the group consisting of a wood, a wood veneer, a paper, a paperboard, a cardboard, a textile, a leather, a nonwoven, a plastic surface, a glass, a ceramic, a mineral building material, and a metal.

13. The method according to claim 11, wherein the substrate is a wood in exterior or interior applications.

14. A process for preparing the polyurethane-polyacrylate hybrid dispersion according to claim 1, the process comprising:

initially introducing the polyurethane (P1) and at least part of an initiator (I1); and starting polymerizing by adding an initiator (I2) and the ethylenically unsaturated compound (e);

subsequently completely or partially consuming the ethylenically unsaturated compound (e) by reaction;

supplying the ethylenically unsaturated compound (f); and continuing the polymerizing to a point of substantially complete conversion.

15. The dispersion according to claim 1, wherein the ethylenically unsaturated compound (e) comprises:

e1) from 70% to 95% by weight of the (cyclo)alkyl (meth)acrylate;

e2) from 5% to 30% by weight of the (meth)acrylate or the (meth)acrylamide which carries the functional group;

e3) from 0% to 10% by weight of a free-radically polymerizable monomer having precisely one free-radically polymerizable double bond and comprising an aromatic ring system;

e4) 0% by weight of an α,β-unsaturated carboxylic acid; and e5) from 0% to 1% by weight of a compound having at least two free-radically polymerizable double bonds, based on a total sum of 100% by weight.

16. The dispersion according to claim 1, wherein the ethylenically unsaturated compound (e) comprises:

e1) from 80% to 90% by weight of the (cyclo)alkyl (meth)acrylate;

e2) from 10% to 20% by weight of the (meth)acrylate or the (meth)acrylamide which carries the functional group;

e3) from 0% to 5% by weight of a free-radically polymerizable monomer having precisely one free-radically polymerizable double bond and comprising an aromatic ring system;

e4) 0% by weight of an α,β-unsaturated carboxylic acid; and e5) from 0% to 0.5% weight of a compound having at least two free-radically polymerizable double bonds, based on a total sum of 100% by weight.

17. The dispersion according to claim 1, wherein the ethylenically unsaturated compound (f) comprises:

f1) from 70% to 95% by weight of a (cyclo)alkyl (meth)acrylate;

f2) from 5% to 30% by weight of a (meth)acrylate or (meth)acrylamide which carries a functional group;

f3) from 0% to 3% by weight of a free-radically polymerizable monomer which comprises an aromatic ring system with precisely one free-radically polymerizable double bond;

f4) optionally an α,β-unsaturated carboxylic acid; and f5) from 0% to 1% by weight of a compound having at least two free-radically polymerizable double bonds, based on a total sum of 100% by weight.

18. The dispersion according to claim 1, wherein the ethylenically unsaturated compound (f) comprises:

f1) from 80% to 90% by weight of a (cyclo)alkyl (meth)acrylate;

f2) from 10% to 20% by weight of a (meth)acrylate or (meth)acrylamide which carries a functional group;

f3) 0% by weight of a free-radically polymerizable monomer which comprises an aromatic ring system with precisely one free-radically polymerizable double bond;

f4) optionally an α,β-unsaturated carboxylic acid; and f5) from 0% to 0.5% by weight of a compound having at least two free-radically polymerizable double bonds, based on a total sum of 100% by weight.

19. The method according to claim 11, wherein the substrate is a coated metal.

20. The dispersion according to claim 2, wherein the preparing of the polyurethane comprises reacting the further polyfunctional compound c) different from the diol (b).

* * * * *